April 13, 1926.  
A. IERISE  
1,580,895

COMBINATION POT FOR COFFEE, TEA, AND MILK

Filed June 3, 1924

INVENTOR  
Antonio Ierise  
BY  
ATTORNEY

Patented Apr. 13, 1926.

1,580,895

UNITED STATES PATENT OFFICE.

ANTONIO IERISE, OF CHESTER, WEST VIRGINIA.

COMBINATION POT FOR COFFEE, TEA, AND MILK.

Application filed June 3, 1924. Serial No. 717,487.

*To all whom it may concern:*

Be it known that I, ANTONIO IERISE, citizen of Italy, residing at Chester, in the county of Hancock and State of West Virginia, have invented certain new and useful Improvements in Combination Pots for Coffee, Tea, and Milk, of which the following is a specification.

This invention relates to a pot or urn for use in preparing tea and coffee, and heating milk for the same, the invention having for an object the provision of a novel and simple pot of this sort, a further object relating to the provision of a novel form of discharge valve mechanism.

For further comprehension of the invention, and of the objects and advantages thereof, reference will be had to the following description and accompanying drawing, and to the appended claims in which the various novel features of the invention are more particularly set forth.

Fig. 1 of the drawing is a side view showing my improved pot.

Figure 1:
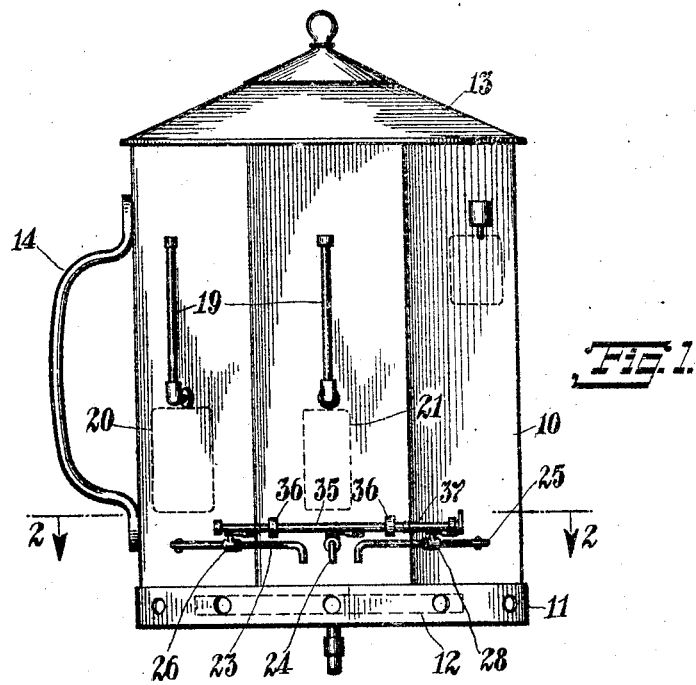

Referring now to the drawing, the reference numeral 10 indicates the body of the pot which may have a downwardly projecting base flange 11 whereby the pot may be conveniently seated over a gas burner 12. The pot is provided with a removable top, 13, and a handle 14. The pot is divided by the transverse partitions 15 into three compartments 16, 17 and 18 respectively, which are adapted to contain tea, coffee and milk. Gauge glasses 19 may be mounted on the sides of the tea and coffee compartments, in which the tea leaves and coffee grains may be suitably supported in the bags 20 and 21.

Leading from the bottom of each compartment is a discharge pipe, the pipes for the respective compartments 16, 17 and 18 being numbered 23, 24 and 25. These pipes all converge toward a common point having their ends downturned in close proximity to one another to form discharge spouts. On these pipes are mounted the valves 26, 27 and 28 which are of ordinary rotary type and provided with operating arms or handles 29, 30 and 31. Means are here provided whereby the valve handle 31 which controls the flow of milk may be connected selectively to the handles of the other valves so that milk and tea, or milk and coffee, may be discharged together into a cup.

As here shown a flat bar 35 extends along in front of the pot and is slidably mounted in the guide elements 36 fixed to the pot. Rotatably mounted upon this bar is a hollow rod 37 which has fixed thereto a pair of pins such as 38 which are adapted to be moved, by partial rotation of the rod, into and out of engagement with longitudinal slots such as 39 in the valve arms 29 and 30 the bar 35 extending over the said arms 29 and 30 and having transverse slots such as 40 therein through which the pins 38 project downwardly. The bar 35 engages the handle 31 through the medium of the pin 41 fixed therein which projects into a longitudinal slot 42 in the handle. The rod 37 projects beyond the bar 35 adjacent the handle 31 and has fixed thereon a forked handle element 43 which may be moved in either direction according as it is desired to connect the tea or the coffee valve arm with the bar.

Figure 2:
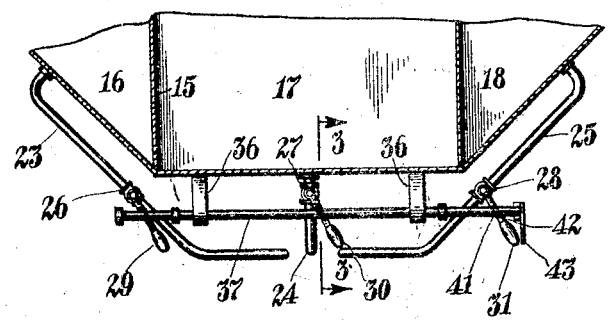
Fig. 2 is a partial horizontal sectional view taken on the line 2—2 of Fig. 1.
Figure 3:
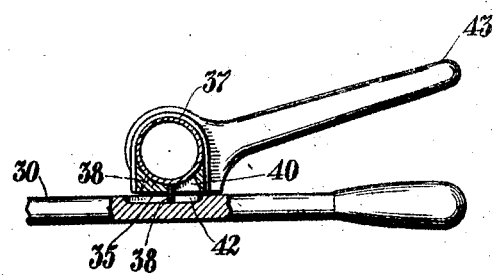
Fig. 3 is a detail transverse sectional view taken on the line 3—3 of Fig. 2.

As indicated in Fig. 2 of the drawing, the two pins 38 are angularly offset from one another so that when one pin is engaged in the slot 40 in the adjacent valve arm the other is free. As will be apparent the person desiring to draw either coffee or tea can readily shift the handle 43 to bring the desired one of the pins 38 into operative relation to the adjacent valve arm thereby causing the desired fluids to be discharged when the handle 31 is swung to open the valve 28. It will be understood that the delivery valve on the milk discharge pipe will be arranged to deliver the proper proportion of milk.

While I have illustrated and described a preferred embodiment of my invention it is to be understood that I do not limit myself to the precise construction herein shown and that various changes and modifications might be made therein without departing from the spirit and scope of the invention as defined in the appended claims.

Having thus described my invention what I claim as new and desire to protect by Letters Patent of the United States is as follows:—

1. A pot divided into compartments for tea, coffee and milk, and discharge pipes leading from said compartments and converging to a common discharge point, and valves on said pipes arranged to open one of said pipes in unison with either of the other two.

2. A pot divided into compartments for tea, coffee and milk, and discharge pipes leading from said compartments and converging to a common discharge point, valves on said pipes, handles for operating said valves, a slidable bar in permanent operative connection with one of said handles, and means for selectively connecting said bar with either of the other handles.

3. A pot divided into compartments for tea, coffee and milk, and discharge pipes leading from said compartments and converging to a common discharge point, valves on said pipes, handles for operating said valves, a slidable bar in operative connection with one of said handles, and means for selectively connecting said bar with either of the other handles, comprising a rod extending along said bar and rotatably mounted thereon, and pins on said rod adapted to engage in slots in the said handles.

4. A pot divided into compartments for tea, coffee and milk, and discharge pipes leading from said compartments and converging to a common discharge point, valves on said pipes, handles for operating said valves, a slidable bar in operative connection with one of said handles, and means for selectively connecting said bar with either of the other handles, comprising a rod extending along said bar and rotatably mounted thereon, and pins on said rod adapted to engage in slots in the said handles, said pins being offset angularly one from the other to cause one pin to disengage from its adjacent slot when the rod is rotated to engage the other pin with its adjacent slot.

In testimony whereof I have affixed my signature.

ANTONIO IERISE.